United States Patent [19]

Koslowski et al.

[11] Patent Number: 5,522,928
[45] Date of Patent: Jun. 4, 1996

[54] BINDER FOR INTERIOR PLASTERS

[75] Inventors: Thomas Koslowski, Aachen; Hans Roggendorf, Ratingen, both of Germany

[73] Assignee: Sicowa Verfahrenstechnik fur Baustoffe GmbH & Co. KG, Germany

[21] Appl. No.: 357,516

[22] Filed: Dec. 16, 1994

[30]    Foreign Application Priority Data

Dec. 16, 1993 [DE] Germany .......................... 43 42 927.0
Jan. 22, 1994 [DE] Germany .......................... 44 01 802.9

[51] Int. Cl.$^6$ .......................... C04B 11/00; C04B 11/06
[52] U.S. Cl. .......................... 106/775; 106/772; 106/782; 106/784; 106/DIG. 1; 106/697; 106/461; 106/462
[58] Field of Search .................... 106/772, 775, 106/784, 697, 461, 782, 462

[56]    References Cited

U.S. PATENT DOCUMENTS

| | | | |
|---|---|---|---|
| 3,687,890 | 8/1972 | Susuki et al. | 106/461 |
| 3,856,746 | 12/1974 | Susuki et al. | 106/461 |
| 4,286,994 | 9/1981 | Müller et al. | 106/775 |
| 4,495,162 | 1/1985 | Jons et al. | 106/775 |
| 5,008,055 | 4/1991 | Holley | 106/775 |
| 5,104,451 | 4/1992 | Steppler et al. | 106/775 |
| 5,169,617 | 12/1992 | Clemens et al. | 106/775 |

FOREIGN PATENT DOCUMENTS

| | | |
|---|---|---|
| 0007610 | 2/1980 | European Pat. Off. . |
| 0021180 | 1/1981 | European Pat. Off. . |
| 0181088 | 5/1986 | European Pat. Off. . |
| 0342272 | 11/1989 | European Pat. Off. . |
| 0394557 | 10/1990 | European Pat. Off. . |
| 0503450 | 9/1992 | European Pat. Off. . |
| 2826769 | 12/1979 | Germany . |
| 3048506 | 7/1982 | Germany . |
| 4242200 | 10/1993 | Germany . |

OTHER PUBLICATIONS

Fred W. Billmeyer; Chemistry Of Synthetic High Polymers; Chemical Abstracts, vol. 99, No. 12, Sep. 19, 1983, pp. 1, 290, 291.

*Primary Examiner*—Karl Group
*Assistant Examiner*—Michael Marcheschi
*Attorney, Agent, or Firm*—Cushman Darby & Cushman

[57]    ABSTRACT

A novel binder for interior plasters having a calcium sulphate component capable of binding in the presence of water and a finely divided residual material component comprised primarily of calcium sulphite, where the residual material is a product of flue gas desulphurization of coal-fired combustion plants.

13 Claims, No Drawings

5,522,928

BINDER FOR INTERIOR PLASTERS

CROSS-REFERENCES

The present application relies for priority upon the inventors' German Patent Application Nos. P 43 42 927.0 and P 44 01 802.9 filed Dec. 16, 1993 and Jan. 22, 1994, respectively, the contents of which are herein incorporated by reference.

FIELD OF THE INVENTION

The present invention relates to a binder for use in preparing interior plasters that contain a calcium sulphate capable of binding in the presence of water, and a finely divided residual material consisting primarily of calcium sulphite, where the residual material is obtained from flue gas desulphurization of coal-fired combustion plants.

BACKGROUND INFORMATION

Gypsum plasters are common interior plasters in conventional use. The binder typically employed with gypsum plasters is calcium sulphate β-hemihydrate, which contains calcium sulphate in an amount greater than 70% by weight. Also included in these conventional plasters are aggregates and additives, or, in some cases, a multi-phase gypsum plaster. An example of a multi-phase plaster is a plaster containing calcium sulphate β-hemihydrate, calcium sulphate anhydrite-II and optionally calcium anhydrite-III, with the aggregates and additives being present in an amount of about 10% by weight. The solidification characteristics of interior plasters are adjusted in accordance with the requirements of the practitioner.

Lime/gypsum interior plasters are likewise used by those skilled in the art. The lime/gypsum plasters typically use a calcium sulphate β-hemihydrate binder in an amount of about 40% by weight.

Suitable aggregates include fine sands, which may be added alone or in combination with other light aggregates. Additives used in the art include accelerators, retardants, thickeners and other like materials. The types and amounts of additives incorporated in a plaster will depend upon the specific requirements of the skilled artisan.

The characteristics of an interior plaster most desired by those skilled in the art include good processability, high water demand, high yield and a low strength adapted to the substrate. Additionally, an interior plaster should be hygienically acceptable and have as light a color as possible. Mechanical processability is another desirable property of an interior plaster.

To achieve the above-desired properties using calcium sulphate α-hemihydrate (calcium sulphate α-hemihydrate can be formed from a flue gas desulphurization process in accordance with German Patent DE-C 28 19 652) is expensive when compared with the cost of a calcined gypsum. Use of calcium sulphate α-hemihydrate in interior plasters has also proved unsuitable because of excessively high strengths resulting from the calcium sulphate modification. A disadvantage of high strength interior plasters is their tendency hinder the penetration of nails and to chip. The yields of such interior plasters are unreasonably low.

Flue gas desulphurization of coal-fired—especially black coal-fired—combustion plants yields a very fine residual material consisting primarily of calcium sulphite hemihydrate. An example of flue gas desulphurization in coal-fired combustion plants is the spray absorption process (SAP).

SUMMARY OF THE INVENTION

The present invention relates to a binder for use in interior plasters comprising:
  (a) a calcium sulphate capable of binding in the presence of water, where the calcium sulphate component has a Blaine specific surface area of about 1,000 to about 10,000 $cm^2/g$ and is included in amount of between 20 and 100 parts by weight; and
  (b) a finely divided residual material consisting primarily of calcium sulphite, where the residual material is a product of flue gas desulphurization of coal-fired combustion plants, and further where the residual material component has a Blaine specific surface area greater than about 10,000 $cm^2/g$ and is included in an amount of between 10 and 80 parts by weight.

This and other features, aspects and advantages of the present invention will become better understood with reference to the following description and appended claims.

DETAILED DESCRIPTION OF THE INVENTION

The inventors discovered that residual material from flue gas desulphurization of coal-fired combustion plants can be employed to prepare binders for use in interior plasters. These binders have numerous advantages, including good processability, high water demand, high yield and a low strength when matched to the substrate. Additionally, the binders of the present invention are inexpensive to produce.

The embodiment of the present invention relates to a binder for use in interior plasters comprising:
  (a) a calcium sulphate capable of binding in the presence of water, where the calcium sulphate component has a Blaine specific surface area of about 1,000 to about 10,000 $cm^2/g$ and is included in amount of between 20 and 100 parts by weight; and
  (b) a finely divided residual material consisting primarily of calcium sulphite, where the residual material is a product of flue gas desulphurization of coal-fired combustion plants, and further where the residual material component has a Blaine specific surface area greater than about 10,000 $cm^2/g$ and is included in an amount of between 10 and 80 parts by weight.

When the calcium sulphate component has a Blaine specific surface area in the range of about 2,000 to about 4,000 $cm^2/g$, the binder preferably contains between 20 and 100 parts by weight of calcium sulphate. For a calcium sulphate component having a Blaine specific surface area in the range of about 4,000 to about 6,000 $cm^2/g$, the binder preferably contains between 20 and 100 parts by weight of calcium sulphate. And a calcium sulphate component having a Blaine specific surface are in the range of about 6,000 to about 8,000 $cm^2/g$ will preferably contain between 20 and 100 parts by weight of calcium sulphate in the binder. The water demand of the presently claimed interior plasters is in the range of about 0.4 to about 0.7. Water demand constitutes the ratio of water to solids.

The calcium sulphate of the present invention is preferably an α-hemihydrate, β-hemihydrate, anhydrite, or some combination thereof. Alpha-hemihydrate is the most preferred calcium sulphate of the present invention.

Calcium sulphite is the primary component of the residual material in the present invention, where the residual material is obtained from flue gas desulphurization of coal-fired combustion plants by means of, for example, the spray absorption process (SAP). The SAP process is well known in the art and usually comprises the following phases: calcium sulphite hemihydrate, calcium hydroxide (Portlandite $Ca(OH)_2$) and calcium carbonate, with a Blaine specific surface area of more than 10,000 $cm^2/g$. (The inventors note that although Blaine values cannot be experimentally determined in this range, the Blaine values nonetheless correspond with the BET values that can be determined for this range.) An example of a residual material composition is as follows:

| | |
|---|---|
| CaO | 56 parts by weight |
| Free Lime | 13 parts by weight (range: from 10 to 15 parts by weight) |
| $SO_2$ | 20 parts by weight |
| $SO_3$ | 3 parts by weight |
| $SiO_2$ | 4 parts by weight |
| Cl | 1 part by weight |
| $CO_2$ | 13 parts by weight |
| Remaining components | 2 parts by weight |

The bulk density of a residual material is about 0.5 $g/cm^3$ and the water requirement ratio (Water/Solids) ("W/S") is about 1:4. The residual material has a light color and is hygienically acceptable with regard to heavy metals, toxic compounds and radioactivity.

Another feature of the residual material of the present invention is the retarding effect that it has on the calcium sulphate component. Aside from this retarding effect, the residual material is, except for the presence of any free lime content, inert, e.g., it produces a lean calcium sulphate and does not cause efflorescence or other undesired reactions in the finished plaster. For this reason, interior plasters of the present invention that incorporate calcium sulphate α-hemihydrate can be inexpensively produced and exhibit desirable characteristics of an interior plaster. These residual materials can also be used to produce interior plasters that use calcium sulphate β-hemihydrate, anhydrite-II, anhydrite-III, or any combination thereof, including combinations that would contain α-hemihydrate.

When α-hemihydrate is employed, the Blaine specific surface area of the calcium sulphate can be adjusted by means of the degree of milling or by the addition of a finer calcium sulphate. The Blaine specific surface area and proportion of the calcium sulphate component can be modified in accordance with the ranges specified herein.

In a preferred embodiment, the binder can contain up to about 21 parts by weight of calcium hydroxide. Although some calcium hydroxide may already be present in the residual material, calcium hydroxide can also be added by the practitioner. Calcium hydroxide is desirable because it causes interior plasters to become more alkaline, which is advantageous if the residual material contains sulphates. A more alkaline composition will minimize the corrosion of nails or other metal materials embedded in an interior plaster. The strength of an interior plaster is also enhanced by the presence of calcium hydroxide.

The presence of calcium hydroxide likewise makes it possible to add a pozzolanic reactant, or a latent hydraulic reactant, which results in strengthening reactions that permit a reduction in the proportion by weight of calcium sulphate. The amount of reduction in calcium sulphate corresponds to the proportion by weight of calcium hydroxide and pozzolanic reactant present. The pozzolanic reactant preferably has a Blaine specific surface area of about 3,000 to about 6,000 $cm^2/g$. Examples of pozzolanic reactants that can used in the present invention include, but are not limited to, ground trass, fly ash and siliceous production residues, such as, for example, grinding sand, blast furnace slag sand and like materials.

The chloride content of the calcium sulphite-containing residual material is preferably reduced in the present invention. More preferably, the chloride content is less than 100 ppm. A reduction in the chloride content can be achieved by, for example, electrostatic separation processes, washing, calcining and like methods.

Interior plasters of the present invention can include conventional aggregates such as, for example, crushed lime sands in an amount up to about 40 parts by weight and/or light weight aggregates in an amount of about 1–3 parts by weight. These proportions are based upon the amount of binder present in the interior plaster mixture.

Customary retardants and accelerators can also be added to effect variations in the solidification characteristics of the interior plaster. Thickeners can likewise be included.

The following non-limiting examples illustrate the invention in more detail.

EXAMPLES

Example 1

In accordance with known methods for preparing interior plasters, the following formulation was prepared and tested:

(1) Calcium sulphate α-hemihydrate (Blaine specific surface area of 2,200 $cm^2/g$) in the amount of 54.87 kg;

(2) Residual material from SAP having the composition described on page 6 herein in the amount of 45.00 kg;

(3) High-viscosity, water-soluble cellulose ether as thickener in the amount of 0.03 kg;

(4) Alkyl polyglycol ether in the amount of 0.03 kg; and (5) Citric anhydride in the amount of 0.05 kg.

Table 1 shows the properties of an interior plaster prepared in accordance with the above-defined formulation.

TABLE 1

| PROPERTY | VALUE |
|---|---|
| Water Requirement (W/S) (Made-up) | 0.50 |
| Bulk Density (Made-up) | 1.51 $g/cm^3$ |
| Yield | 100 l of Made-up Mortar/ 100 kg of Dry Mortar |
| Dry Bulk Density | 1.05 $g/cm^3$ |
| Stiffening | Commenced at Approx. 140 min. After Make-up* |
| Compressive Strength (DIN 1168) | Approx. 5.6 $N/mm^2$ |
| Bending Strength (DIN 1168) | Approx. 1.6 $N/mm^2$ |

*The stiffening property is adjustable according to the amount of citric anhydride present.

The stiffening property is adjustable according to the amount of citric anhydride present.

Machine processability of the interior plaster is possible approximately 70 min. after the above-prepared mortar is applied to an appropriate substrate.

Example 2

In accordance with known methods for preparing interior plasters, the following formulation was prepared and tested:

(1) Calcium sulphate α-hemihydrate (Blaine specific surface area of 2,200 $cm^2/g$) in the amount of 45.71 kg;

(2) Residual material from SAP having the composition described on page 6 herein in the amount of 43.00 kg;

(3) Calcium hydroxide in the amount of 1.00 kg;

(4) Crushed lime sand having a grain size of from 0–1 mm in the amount of 10.00 kg;

(5) High-viscosity, water-soluble cellulose ether as thickener in the amount of 0.20 kg;

(6) Alkyl polyglycol ether in the amount of 0.005 kg; and (7) Citric anhydride in the amount of 0.08 kg.

Table 2 shows the properties of an interior plaster prepared in accordance with the above-defined formulation.

TABLE 2

| PROPERTY | VALUE |
| --- | --- |
| Water Requirement (W/S) (Made-up) | 0.58 |
| Bulk Density (Made-up) | 1.44 g/cm$^3$ |
| Yield | 110 1 of Made-up Mortar/ 100 kg of Dry Mortar |
| Dry Bulk Density | 1.03 g/cm$^3$ |
| Compressive Strength (DIN 1168) | Approx. 3.8 N/mm$^2$ |
| Bending Strength (DIN 1168) | Approx. 1.3 N/mm$^2$ |

Example 3

In accordance with known methods for preparing interior plasters, the following formulation was prepared and tested:

(1) Calcium sulphate α-hemihydrate (Blaine specific surface area of 2,200 cm$^2$/g) in the amount of 42.715 kg;

(2) Residual material from SAP having the composition described on page 6 herein in the amount of 44.000 kg;

(3) Crushed lime sand having a grain size of from 0–1 mm in the amount of 14.000 kg;

(4) High-viscosity, water-soluble cellulose ether as thickener in the amount of 0.200 kg;

(5) Alkyl polyglycol ether in the amount of 0.005 kg; and (6) Citric anhydride in the amount of 0.080 kg.

Table 3 shows the properties of an interior plaster prepared in accordance with the above-defined formulation.

TABLE 3

| PROPERTY | VALUE |
| --- | --- |
| Water Requirement (W/S) (Made-up) | 0.53 |
| Bulk Density (Made-up) | 1.46 g/cm$^3$ |
| Yield | 103 1 of Made-up Mortar/ 100 kg of Dry Mortar |
| Dry Bulk Density | 1.04 g/cm$^3$ |
| Compressive Strength (DIN 1168) | Approx. 4.0 N/mm$^2$ |
| Bending Strength (DIN 1168) | Approx. 1.8 N/mm$^2$ |

Example 4

In accordance with known methods for preparing interior plasters, the following formulation was prepared and tested:

(1) Calcium sulphate α-hemihydrate (Blaine specific surface area of 2,200 cm$^2$/g) in the amount of 22.65 kg;

(2) Residual material from SAP having the composition described on page 6 herein in the amount of 40.00 kg;

(3) Calcium hydroxide in the amount of 2.00 kg;

(4) Crushed lime sand having a grain size of from 0–1 mm in the amount of 25.00 kg;

(5) High-viscosity, water-soluble cellulose ether as thickener in the amount of 0.25 kg;

(6) Alkyl polyglycol ether in the amount of 0.02 kg; and (7) Citric anhydride in the amount of 0.08 kg.

Table 4 shows the properties of an interior plaster prepared in accordance with the above-defined formulation.

TABLE 4

| PROPERTY | VALUE |
| --- | --- |
| Water Requirement (W/S) (Made-up) | 0.50 |
| Bulk Density (Made-up) | 1.41 g/cm$^3$ |
| Yield | 106 1 of Made-up Mortar/ 100 kg of Dry Mortar |
| Dry Bulk Density | 1.01 g/cm$^3$ |
| Compressive Strength (DIN 1168) | Approx. 2.0 N/mm$^2$ |
| Bending Strength (DIN 1168) | Approx. 1.0 N/mm$^2$ |
| Water Retention | Approx. 98% |

Example 5

In accordance with known methods for preparing interior plasters, the following formulation was prepared and tested:

(1) Calcium sulphate α-hemihydrate (Blaine specific surface area of 2,200 cm$^2$/g) in the amount of 33.715 kg;

(2) Residual material from SAP having the composition described on page 6 herein in the amount of 44.000 kg;

(3) Crushed lime sand having a grain size of from 0–1 mm in the amount of 10.000 kg;

(4) High-viscosity, water-soluble cellulose ether as thickener in the amount of 0.200 kg;

(5) Alkyl polyglycol ether in the amount of 0.005 kg; and (6) Citric anhydride in the amount of 0.080 kg.

Table 5 shows the properties of an interior plaster prepared in accordance with the above-defined formulation.

TABLE 5

| PROPERTY | VALUE |
| --- | --- |
| Water Requirement (W/S) (Made-up) | 0.54 |
| Bulk Density (Made-up) | 1.44 g/cm$^3$ |
| Yield | 105 1 of Made-up Mortar/ 100 kg of Dry Mortar |
| Dry Bulk Density | 1.01 g/cm$^3$ |
| Compressive Strength (DIN 1168) | Approx. 3.6 N/mm$^2$ |
| Bending Strength (DIN 1168) | Approx. 1.3 N/mm$^2$ |

Example 6

In accordance with known methods for preparing interior plasters, the following formulation was prepared and tested:

(1) Calcium sulphate α-hemihydrate (Blaine specific surface area of 2,200 cm$^2$/g) in the amount of 35.715 kg;

(2) Residual material from SAP having the composition described on page 6 herein in the amount of 44.000 kg;

(3) Black coal fly ash in the amount of 10.00 kg;

(4) Crushed lime sand having a grain size of from 0–1 mm in the amount of 10.00 kg;

(5) High-viscosity, water-soluble cellulose ether as thickener in the amount of 0.200 kg;

(6) Alkyl polyglycol ether in the amount of 0.005 kg; and (7) Citric anhydride in the amount of 0.080 kg.

Table 6 shows the properties of an interior plaster prepared in accordance with the above-defined formulation.

TABLE 6

| PROPERTY | VALUE |
| --- | --- |
| Water Requirement (Made-up) | 0.53 |
| Bulk Density (Made-up) | 1.40 g/cm$^3$ |
| Yield | 104 l of Made-up Mortar/ 100 kg of Dry Mortar |
| Dry Bulk Density | 1.03 g/cm$^3$ |
| Compressive Strength (DIN 1168) | Approx. 3.8 N/mm$^2$ |
| Bending Strength (DIN 1168) | Approx. 1.5 N/mm$^2$ |

The make-up water requirement was in each of Examples 1–6 determined in accordance with DIN 1168.

While the invention has been described in connection with what is presently considered to be the most practical and preferred embodiment, it is understood that the invention is not limited to the disclosed embodiment, but on the contrary is intended to cover various modifications and equivalent arrangements included within the spirit and scope of the appended claims.

Thus, it is to be understood that variations in the binder compositions for use in interior plasters can be made without departing from the novel aspects of the invention as defined in the claims.

We claim:

1. A binder for use in interior plasters consisting essentially of:

(a) a hydratable calcium sulphate, wherein said calcium sulphate has a Blaine specific surface area of about 1,000 to about 10,000 cm$^2$/g, and is included in an amount of between 20 and 100 parts by weight; and (b) a finely divided residual material including calcium sulphite, wherein said residual material is a product of flue gas desulphurization of coal-fired combustion plants, and further wherein said residual material has a Blaine specific surface area of greater than about 10,000 cm$^2$/g and is included in an amount of between 10 and 80 parts by weight.

2. The binder according to claim 1, wherein the residual material has a bulk density of about 0.5 g/cm$^3$.

3. The binder according to claim 1, wherein the residual material has a chlorine content of less than about 100 ppm.

4. The binder according to claim 1, wherein the calcium sulphate is selected from the group consisting of α-hemihydrate, β-hemihydrate and anhydrite.

5. The binder according to claim 4, wherein the calcium sulphate is α-hemihydrate.

6. The binder according to claim 1, further consisting essentially of calcium hydroxide in an amount not greater than about 21 parts by weight.

7. The binder according to claim 6, further consisting essentially of a pozzolanic reactant.

8. The binder according to claim 7, wherein the pozzolanic reactant has a Blaine specific surface area of about 3,000 to about 6,000 cm$^2$/g.

9. The binder according to any one of claims 7–8, wherein the proportion by weight of calcium sulphate in the excess of 20 parts by weight to be included in said binder, is proportionally reduced by the proportion by weight of calcium hydroxide and pozzolanic reactant to be included in said binder.

10. The binder according to claim 6, further consisting essentially of a latent hydraulic reactant.

11. The binder according to claim 1, wherein the calcium sulphate has a Blaine specific surface area in the range of about 2,000 to about 4,000 cm$^2$/g and is present in an amount of between 20 and 50 parts by weight.

12. The binder according to claim 1, wherein the calcium sulphate has a Blaine specific surface area in the range of about 4,000 to about 6,000 cm$^2$/g and is present in an amount of between 40 and 70 parts by weight.

13. The binder according to claim 1, wherein said calcium sulphate has a Blaine specific surface area in the range of about 6,000 to about 8,000 cm$^2$/g and is present in an amount of between 70 and 85 parts by weight.

\* \* \* \* \*